United States Patent [19]
Guasch et al.

[11] Patent Number: 5,720,366
[45] Date of Patent: Feb. 24, 1998

[54] DISC BRAKE WITH CAM OPERATING DEVICE

[75] Inventors: Esteve Cortes Guasch; Joan Simon Bacardit; Jose Manuel Vila Boluda, all of Barcelone, Spain

[73] Assignee: Knorr Bremse AG, Munich, Germany

[21] Appl. No.: 546,340

[22] Filed: Oct. 20, 1995

[30] Foreign Application Priority Data

Apr. 27, 1993 [FR] France ................. 93 04989
Apr. 27, 1994 [WO] WIPO ........... PCT/DE94/00468

[51] Int. Cl.⁶ ................................................. F16D 65/56
[52] U.S. Cl. ................................. 188/72.6; 188/72.9
[58] Field of Search ....................... 188/72.9, 72.6, 188/72.7, 71.9, 71.8, 71.7

[56] References Cited

U.S. PATENT DOCUMENTS 4,089,393  5/1978  Falk ........................ 188/72.6

FOREIGN PATENT DOCUMENTS 4217983   1/1993   Germany ................. 188/72.6
9267202   4/1992   WIPO ...................... 188/72.6
9428331  12/1994   WIPO ...................... 188/72.6

Primary Examiner—Matthew C. Graham

[57] ABSTRACT

Disc brake having a caliper displacable on a stationary support to press a pair of brake shoes on each side of a brake disc, a brake operating device having a piston rod acting upon a rotating lever, the rotating lever rotates about a first axis perpendicular to the axis of the brake disc, the rotating lever interacting with a pressure piece by an eccentric bearing having a shaft which can be swivelled about a second axis on the rotating lever which second axis is offset with respect to the first axis of rotation of the rotating lever. The shaft of the eccentric bearing interacts with the rotating lever by coaxial cylindrical shaft situated on both sides of the pressure piece.

13 Claims, 3 Drawing Sheets

DISC BRAKE WITH CAM OPERATING DEVICE

BACKGROUND AND SUMMARY OF THE INVENTION

The invention relates to disc brakes in general and particularly to disc brakes for vehicles, such as motor vehicles.

In particular, the invention relates to sliding caliper disc brakes in the case of which the operating mechanism has an eccentric bearing.

Disc brakes of this type are known to the person skilled in the art. Patent Document WO 92/07202 explains such a disc brake in the case of which the operating device is constructed such that a pressure piece acts upon a first brake shoe and as a reaction thereto the caliper acts upon a second brake shoe. The operating device consists of a pneumatic drive whose output or piston rod acts upon a body which rotates about an axis which extends perpendicular to the axis of the brake disc. This rotating body or rotating lever is supported on a bearing surface of the caliper pointed in the direction of the brake disc. The rotating lever or rotating body acts upon the pressure piece by a shaft which engages eccentrically with respect to the axis of rotation of the rotating lever and exercises a pressure on the pressure piece which is aimed in the direction of the brake disc, whereby the rotating lever and the pressure piece are coupled only in the rotating direction. The shaft is disposed in semi-cylindrical shells in the rotating lever and in the pressure piece. Such an arrangement has various disadvantages. Each mechanical disc brake application system must contain an automatic adjusting system; that is, an arrangement which permits the same operating stroke independent of the wear and therefore independent of the thickness of the brake linings. Normally, such a system forms the connecting link between the pressure piece receiving the operating force of the brake and of the brake shoe which is in contact with one of the brake linings. In which case, a lengthening or stretching of this connecting link is automatically possible for the purpose of compensating the wear of the brake lining.

Such automatically operating adjusting systems have an axially bulky construction (in the direction of the application of the brake force) which is not negligible because the mechanism controlling its lengthening must also be housed in this space and at the same time resistance is required with respect to the braking force which may assume very high values in the case of disc brakes.

If an automatic adjuster is housed in the shaft of the pressure piece, as illustrated in European Patent Document EP-A 0,260,934, it is required to enlarge the axial length of the disc brake. In order to avoid this disadvantage, it is possible, as in the case of the first-mentioned document, to displace the axis of the automatic adjusting system with respect to the axis of the pressure piece. In this case, it is necessary to align two automatic adjusting systems symmetrically with respect to the axis of the pressure piece in order to prevent a jamming of the disc brake. The consequence is an increased space requirement in the transverse direction of the brake disc and a resulting increased complexity of the construction because it is required to synchronize the two automatic adjusting systems in order to achieve a uniform wear of the brake linings.

Based on the above, it is an object of the present invention to develop a disc brake of the initially mentioned type such that it has reduced space requirements, can be easily assembled and has a reliable operation while the stretching or adjusting movement of the automatic adjusting system should not be limited.

For achieving this object, the shaft of the eccentric bore interacts with the rotating body or rotating lever by two coaxial cylindrical bearing surfaces, which extend on both sides of the pressure piece.

According to an advantageous characteristic of the invention, the cylindrical bodies or the cylindrical bearing surfaces of the shaft are connected with the pressure piece, and are preferably manufactured in one piece with this pressure piece.

For a simplified fastening and mounting, the rotating lever or rotating body comprises two mutually separate cylindrical shells which each have a center-offset bore for receiving one respectively of the cylindrical bearing bodies or bearing surfaces of the shaft as well as one radial projection respectively which forms an operating lever.

For compensating manufacturing tolerances, it is preferably possible to operate the two projections of the rotating body or rotating lever by means of a transverse rod, in which case a ball-and-socket joint is preferably constructed between the transverse rod and each of the projections.

With the inclusion of additional objects, characteristics and advantages, the invention will be explained in the following by means of a non-limiting embodiment with reference to the attached drawing.

DETAILED DESCRIPTION OF THE PREFERRED EMBODIMENTS

In the different figures, identical components have the same reference numbers. The term "forward" is used for describing parts of the brake which are aimed in the direction of the brake disc, while the term "rearward" or "rearwards" and the like is used for those parts which are aimed in the opposite direction. Therefore, in FIG. 1 and 3, "forward" is directed toward the left while "rearwards" or "rearward" is directed toward the right.

Figure 2:
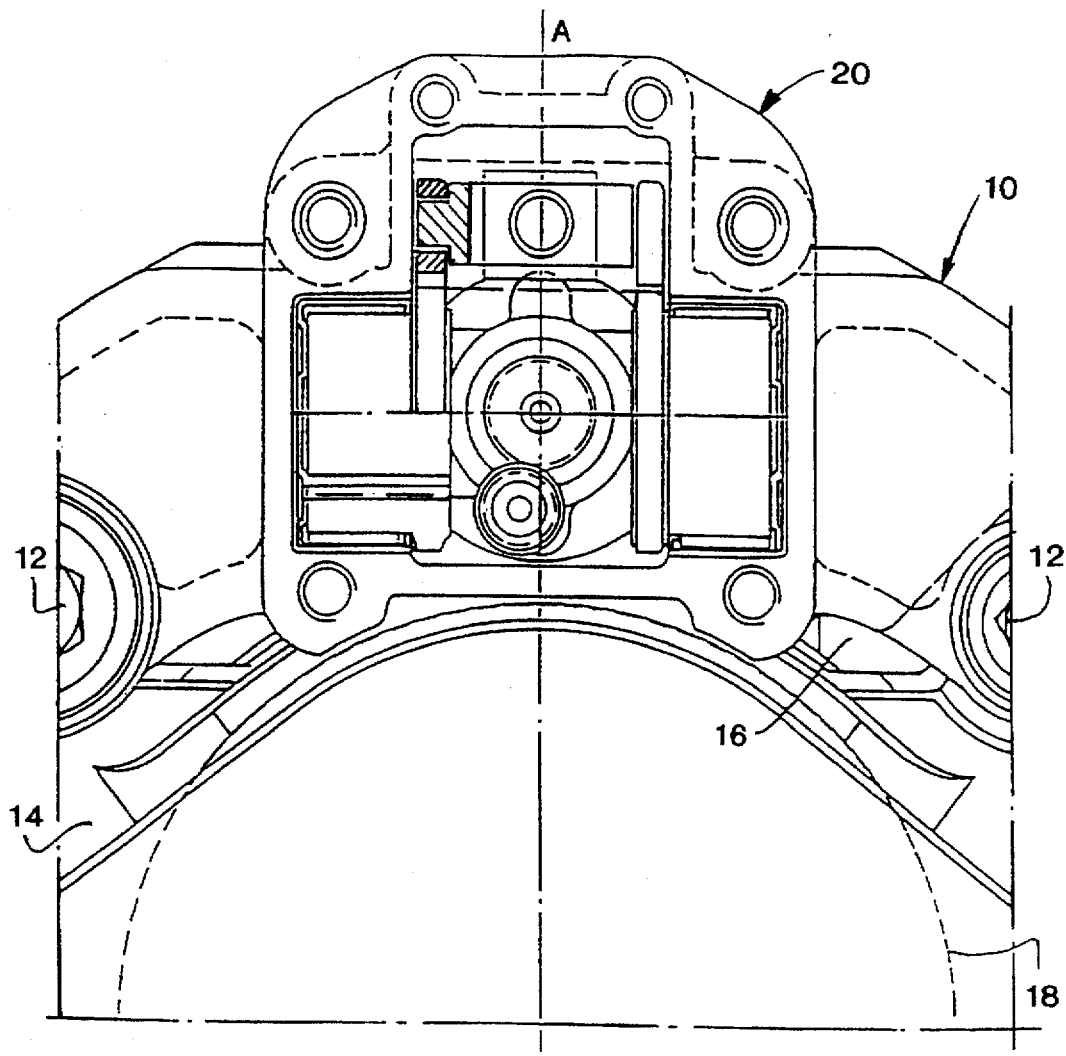
FIG. 2 is a cross-sectional view of the disc brake according to FIG. 1.

The disc brake illustrated in the figures has a caliper 10 which can be displaced by guide pins 12 on a stationary support 14 as shown in FIG. 2. The support 14 is assigned to a stationary part of the motor vehicle (not shown). On both sides of a brake disc 18, the disc brake has brake linings 16. The caliper 10 is equipped with an operating device 20.

Figure 1:
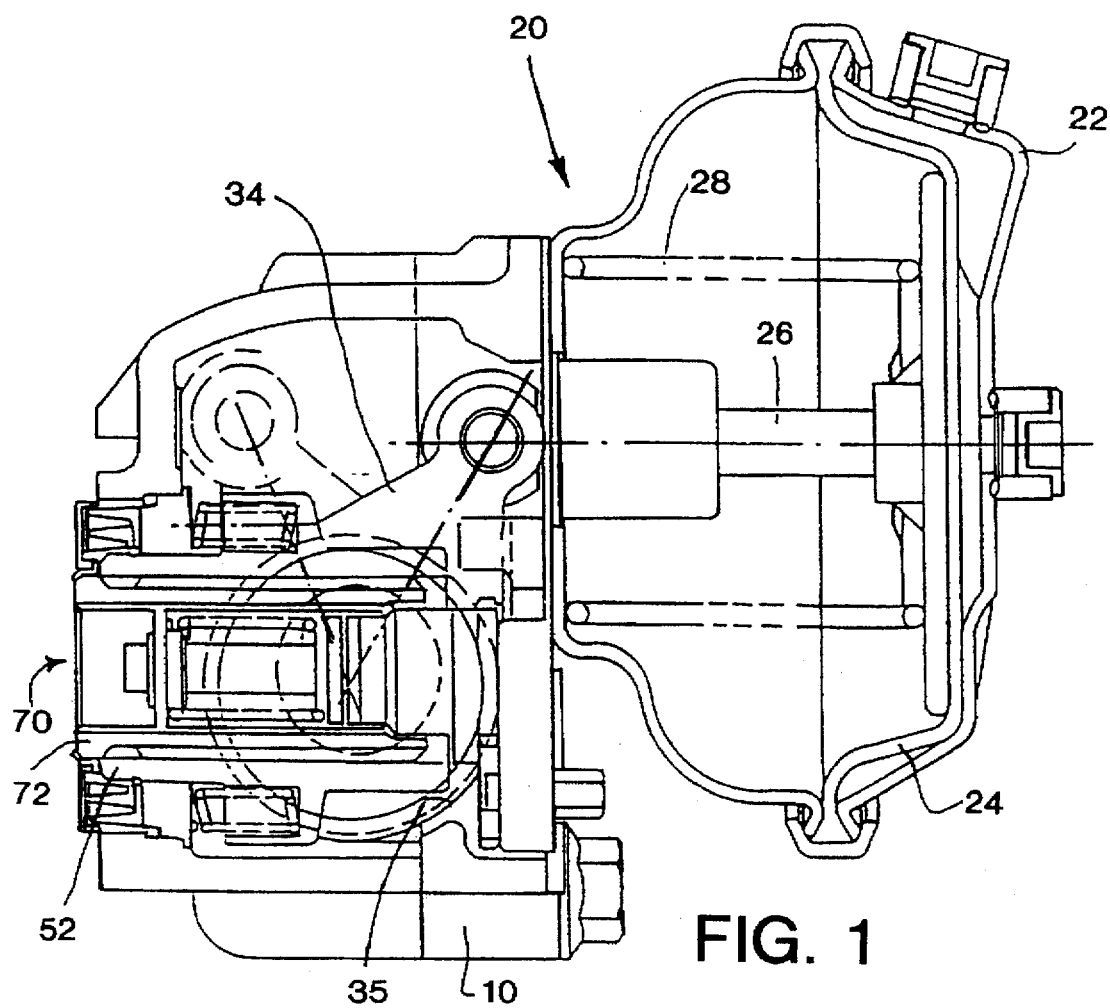
FIG. 1 is an axial sectional view of the disc brake according to the invention.

In the illustrated embodiment, the brake operating system 20 is of a pneumatic type and contains a housing 22 which is divided into two chambers by a diaphragm 24 as shown in FIG. 1. The diaphragm 24 activates a piston rod 26 under the effect of the different pressures which act upon the two diaphragm surfaces. A pressure spring 28 moves the diaphragm 24 and the piston rod 26 back into their starting position.

Figure 3:
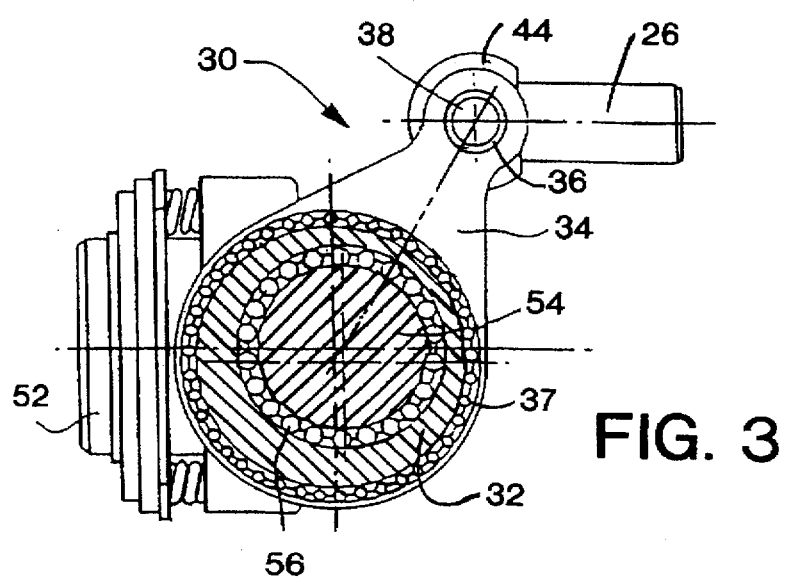
FIG. 3 is an axial sectional view of the operating and application mechanism of the disc brake along lines III—III of FIG. 4.
Figure 5:
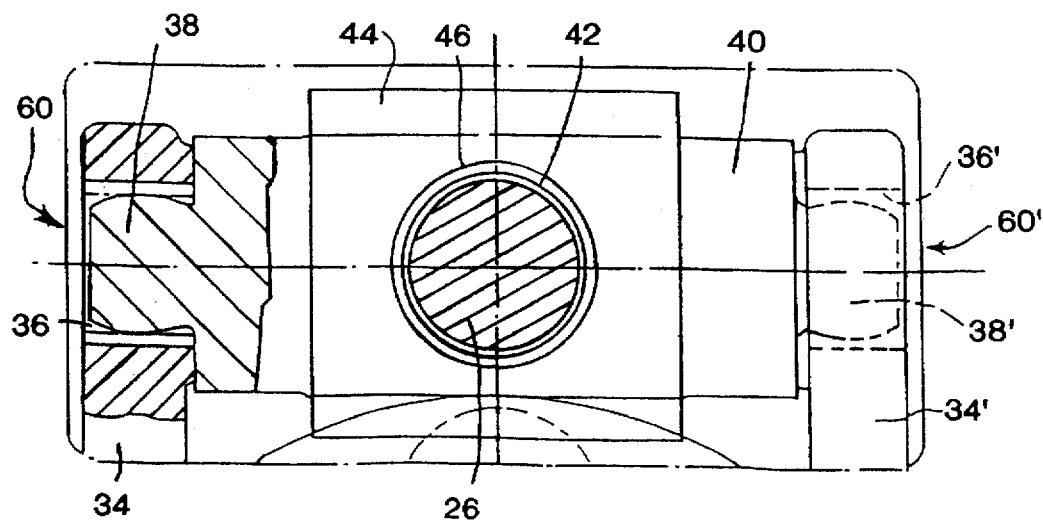
FIG. 5 is an enlarged representation of a detail of the arrangement according to FIG. 4.
Figure 4:
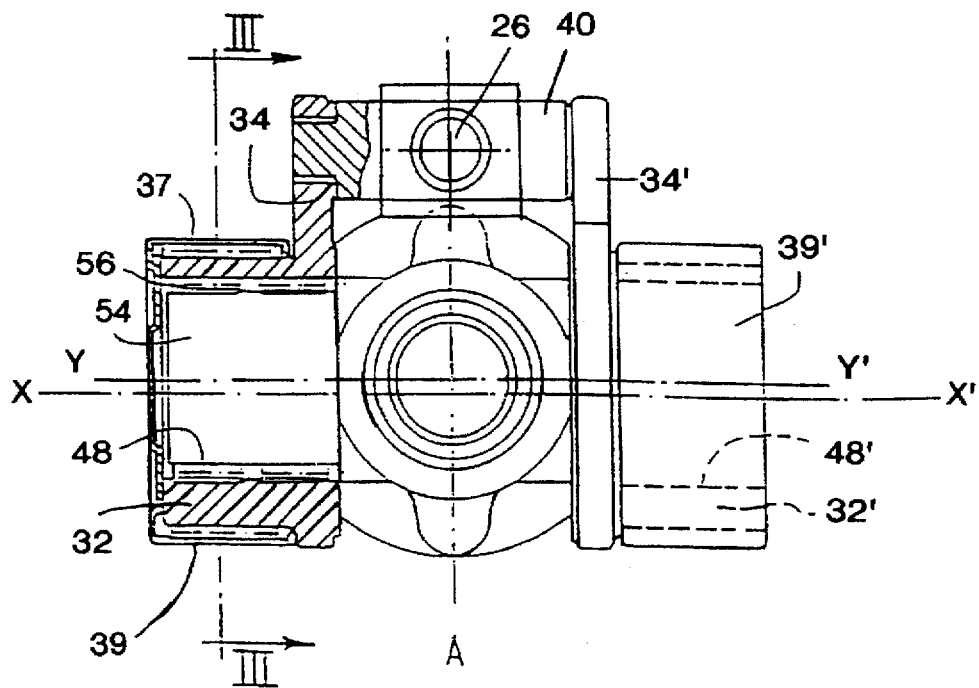
FIG. 4 is a cross-sectional view of the application mechanism according to FIG. 3.

The piston rod 26 activates a rotating lever 30 which is illustrated in detail in FIGS. 3 to 5, FIG. 3 being a sectional view of Line III—III in FIG. 4. It is illustrated that the rotating lever 30 consists essentially of two individual cylindrical shells 32 and 32' which are aligned symmetrically with respect to the plane A extending through the axis of the brake disc 18 and the axis XX'.

Each shell 32, 32' has a lever or radial projection 34, 34' which is a component of an operating lever. An opening 36, 36' is constructed on the end of each radial projection 34, 34'.

The openings 36, 36' receive the ends 38, 38' of a transverse rod 40. The center of rod 40 includes an opening 42 (FIG. 5) which receives the piston rod 26 of the application device or brake operating system 20. A cylindrical sleeve 44 with an opening 46 may be pushed on the transverse rod 40 in order to activate it by means of the piston rod 26. Each shell 32, 32' includes a bore 48, 48' whose axis YY' is offset with respect to the axis XX'.

When the disc brake is assembled, as illustrated in FIG. 1, the shells 32, 32' are rotatably disposed in at least partially cylindrical housing projections 35 of the caliper 10. It is essentially sufficient that the caliper has a concave-cylindrical surface 35 which is directed forward. Between the shells 32, 32' and the housing projection or the concave-cylindrical surface 35 of the caliper, a roller bearing is provided, for example, in the form of self-lubricating bearings, or, according to the representation in FIG. 4, in the form of needle bearings 37, 37' which are protected by means cages 39, 39'.

Figure 6:
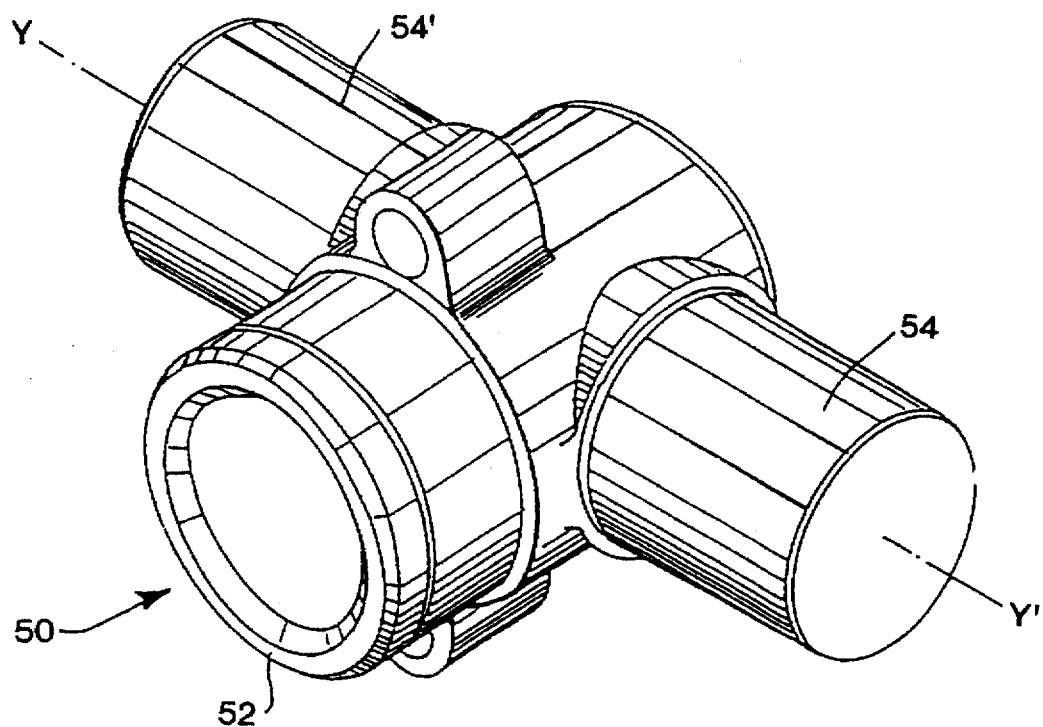
FIG. 6 is a perspective view of the pressure piece of the disc brake according to the invention.

Furthermore, the disc brake has a pressure unit 50 which is shown in a perspective view in FIG. 6. The pressure unit 50 consists essentially of a hollow cylindrical pressure piece 52 which can be operated by two massively constructed cylinders or cylindrical shafts 54, 54'. The cylinders 54, 54' are coaxial with respect to one another and extend perpendicularly to the hollow cylinder 52. The massively constructed cylinders 54, 54' are fastened on the pressure piece 52 and are preferably constructed in one piece with it. The two cylinders 54 and 54' form the two bearing surfaces of an eccentric bearing and are rotatably received in the bores 48, 48' of the shells 32, 32'.

Between the bearing surfaces of the cylinders 54, 54' and the shells 32, 32', a roller bearing may be provided, for example, self-lubricating bearings, or according to the representation, by means of needle bearings 56, 56'.

The method of operation of the disc brake will become clear with reference to the above explanations.

When the disc brake is in the inoperative position, that is, in the position illustrated in FIG. 1 and a brake operation is desired, a pressure difference will be generated in the housing 22 between the chambers separated by the diaphragm 24 in that, for example, the pressure in the rearward chamber (on the right in FIG. 1) is increased or in that the pressure in the forward chamber (on the left in FIG. 1) is reduced.

Under the effect of this differential pressure, the diaphragm 24 and the piston rod 26 move forward, in which case the forward end of the piston rod 26 interacts with the sleeve 44 in order to move the transverse rod 40 in the forward direction. The transverse rod contributes to a forward-directed swivelling of the two levers or projections 34, 34'.

In order to take into account the manufacturing tolerances between the overall lengths of the lever arms or radial projections 34, 34', between the eccentricities of the bores 48, 48' in the shells 32, 32', the diameters of these bores and these shells as well as the radius of curvature of the housing projection 35 and in order to not generate excessive tensions in the various components of the disc brake, one ball-and-socket joint 60, 60' respectively may preferably be provided between each end 38, 38' of the transverse rod 40 and the corresponding projection 34, 34'. Thus, for example, the ends 38, 38' may have a spherical segment shape and may interact with the interior walls of the openings 36, 36' on the end of the levers or projections 34, 34' such that a small angle deflection is permitted with respect to the right angle which normally exists between the axis of the transverse rod 40 and the axis of the levers or projections 34, 34'.

On the other hand, spherical-segment-shaped protrusions may also be provided at the end of the projections 34, 34', which protrusions are aimed in the direction of the plane A and interact with the wall of the bores situated at the ends of the transverse rod 40.

In addition, a ball-and-socket joint may be provided between the transverse rod 40 and the piston rod 26 in that the end of the piston rod 26 has a spherical segment shape which interacts with the interior wall of the opening 42 of the transverse rod 40.

During their forward swivel motion, the projections 34, 34' rotate the shells 32, 32' about their axis XX', in which case they are supported in a rolling manner on the housing projection 35 of the caliper aligned in the direction of the brake disc.

By rotating the shells 32, 32' about their axis XX', a rotation of the axis YY' of the bores 48, 48' about this axis XX' is triggered. The cylinders 54, 54' therefore move forward while the shells 32, 32' rotate around them. Since the bearing surfaces or cylinders 54, 54' are fixedly connected with the pressure piece 52, or form one part with it, the pressure piece 52 is also moved in the forward direction.

By the above-described arrangement according to the invention, that is, by the eccentric bearing which is moved by the cylinders 54, 54' arranged on both sides of the pressure piece 52, it is possible to house inside the hollow pressure piece 52 an automatic adjusting system, as illustrated in FIG. 1, because no mutual engagement is possible between this system and the shaft of the eccentric bearing.

The pressure piece 52 may therefore be provided with an internal thread and form the control or adjusting nut of an automatic adjusting system of any type which controls the rotation of an adjusting screw 72 whose forward end is in direct contact with the brake shoe or the brake lining 16. By the rotation of the adjusting screw 72, the screw-nut arrangement 52-72 is moved out as a function of the wear of the brake lining 16.

An essential advantage of the arrangement according to the invention consists of the fact that the, automatic adjusting system may take up the whole interior of the hollow pressure piece 52 and, as a result, a considerable stretching of the screw-nut arrangement 52-72 is permitted. In this manner, considerably thicker brake linings may be used which leads to less frequent changes of the brake lining. In the case of commercial vehicles, this represents an advantage because inoperative times must be reduced to a minimum.

According to the invention, a disc brake was provided which has a compact construction in the axial direction as well as in the transverse direction and is very easy to manufacture and assemble. By means of the simple construction and the simplicity of the assembly, reliability is achieved in the operation. Furthermore, the manufacturing costs as well as the maintenance costs of the disc brake may be lowered. The arrangement finally makes it possible to considerably stretch the adjusting system, whereby the servicing intervals may be set up to be longer.

The invention is not limited to the described embodiment but comprises different types of developments and further developments which are familiar to a person skilled in the art.

We claim:

1. Disc brake having a caliper displaceable on a stationary support to press a pair of brake shoes on each side of a brake disc by a pressure piece, a brake operating device having a piston rod acting upon a rotating lever, the rotating lever rotates about a first axis perpendicular to the axis of the brake disc, the rotating lever interacting with said pressure piece by an eccentric bearing having a shaft which can be swivelled about a second axis on the rotating lever which second axis is offset with respect to the first axis of rotation of the rotating lever, wherein the shaft of the eccentric beating interacts with the rotating lever by coaxial cylindrical shafts situated on both sides of, separated by and constructed in one piece with the pressure piece.

2. Disc brake according to claim 1, wherein the cylindrical shafts of the eccentric bearing are connected with the pressure piece.

3. Disc brake according to claim 1, wherein the rotating lever has two cylindrical shells which are separated from one another and which each contain a center-offset bore, the bores each being used for receiving the cylindrical shafts, and contain radial projections extending from the shells forming an operating lever.

4. Disc brake according to claim 1, including roller bearings between the rotating lever and the caliper as well as between the rotating lever and the cylindrical shafts of the eccentric bearing.

5. Disc brake according to claim 4, wherein the roller bearings consist of needle bearings.

6. Disc brake according to claim 1, wherein said pressure piece is hollow; and including an automatic adjusting system in said hollow pressure piece.

7. Disc brake according to claim 1, wherein the brake operating device is a pneumatic drive.

8. Disc brake having a caliper displaceable on a stationary support to press a pair of brake shoes on each side of a brake disc by a pressure piece, a brake operating device having a piston rod acting upon a rotating lever, the rotating lever rotates about a first axis perpendicular to the axis of the brake disc, the rotating lever interacting with said pressure piece by an eccentric bearing having a shaft which can be swivelled about a second axis on the rotating lever which second axis is offset with respect to the first axis of rotation of the rotating lever, wherein the shaft of the eccentric bearing interacts with the rotating lever by coaxial cylindrical shafts situated on both sides of the pressure piece, the rotating lever has two cylindrical shells which are separated from one another and which each contain a center-offset bore receiving the cylindrical shafts, and the lever includes a radial projections extending from the shells forming an operating lever.

9. Disc brake having a caliper displacable on a stationary support to press a pair of brake shoes on each side of a brake disc by a pressure piece, a brake operating device having a piston rod acting upon a rotating lever, the rotating lever rotates about a first axis perpendicular to the axis of the brake disc, the rotating lever interacting with said pressure piece by an eccentric bearing having a shaft which can be swivelled about a second axis on the rotating lever which second axis is offset with respect to the first axis of rotation of the rotating lever, wherein the shaft of the eccentric bearing interacts with the rotating lever by coaxial cylindrical shafts situated on both sides of the pressure piece, and the rotating lever has two shells which are separated from one another and receive the cylindrical shafts and which each includes a radial projection extending from the shell forming an operating lever.

10. Disc brake according to claim 9, wherein the two operating levers of the rotating lever can be activated simultaneously by the piston rod of the brake operating device.

11. Disc brake according to claim 10, wherein the two operating levers of the rotating lever are connected with the piston rod of the brake operating device by a transverse rod.

12. Disc brake according to claim 11, where in a ball-and-socket joint connects the transverse rod and each of the projections.

13. Disc brake according to claim 12, wherein a ball-and-socket joint connects the transverse rod and the piston rod of the brake operating device.

* * * * *